United States Patent [19]

McDonald

[11] Patent Number: 4,827,742
[45] Date of Patent: May 9, 1989

[54] SECURITY ASSEMBLY FOR VEHICLE ROOFRACK

[75] Inventor: Roderick R. McDonald, Castle Hill, Australia

[73] Assignee: Unistrut Australia Pty. Ltd., Mount Druitt, Australia

[21] Appl. No.: 10,216

[22] Filed: Feb. 3, 1987

[30] Foreign Application Priority Data

Feb. 4, 1986 [AU] Australia .............................. PH4435

[51] Int. Cl.$^4$ ............................................. E05B 73/00
[52] U.S. Cl. ......................................... 70/19; 70/181; 70/238; 182/127; 224/323
[58] Field of Search .................... 70/19, 181, 238, 215, 70/217; 182/127; 248/503, 551, 553; 224/309, 310, 323–325, 331, 42.4, 42.38, 42.45, 42.19, 42.1

[56] References Cited

U.S. PATENT DOCUMENTS

| | | | |
|---|---|---|---|
| 2,201,963 | 5/1940 | Wartian | 70/215 X |
| 2,255,418 | 9/1941 | Fletcher | 70/215 |
| 2,948,509 | 8/1960 | Rounds et al. | 248/503 |
| 3,245,239 | 4/1966 | Zaidener | 70/238 X |
| 3,283,972 | 11/1966 | Kochina | 182/127 X |
| 3,638,844 | 2/1972 | Bronson | 224/323 X |
| 3,664,164 | 5/1972 | Zaidener | 70/238 X |
| 3,672,612 | 6/1972 | Laing, Jr. | 182/127 X |
| 3,722,766 | 3/1973 | Barrineau et al. | 224/323 X |
| 3,877,624 | 4/1975 | Carson | 248/503 X |
| 3,888,398 | 6/1975 | Payne | 248/503 X |
| 3,904,094 | 9/1975 | Correll | 248/503 X |
| 4,008,838 | 2/1977 | Correll | 182/127 X |
| 4,013,203 | 3/1977 | McCauley | 248/503 X |
| 4,015,761 | 4/1977 | Kokko | 248/503 X |
| 4,077,553 | 3/1978 | Miller | 224/331 |
| 4,084,414 | 4/1978 | Martin | 70/181 |
| 4,170,331 | 10/1979 | Faulstich | 224/324 |
| 4,262,834 | 4/1981 | Nutt | 182/127 X |
| 4,372,470 | 2/1983 | Dallaire | 224/323 X |
| 4,390,117 | 6/1983 | Fagan | 182/127 X |

OTHER PUBLICATIONS

Research Disclosure, #19718, Quick Release Ladder Clamp (Sep. 1980, No. 197).

Primary Examiner—Gary L. Smith
Assistant Examiner—Suzanne L. Dino
Attorney, Agent, or Firm—Ladas & Parry

[57] ABSTRACT

A security assembly to secure a ladder to a roofrack, the assembly includes a lock which moves a hooked rod from an engaging position with respect to a rung of the ladder, to a release position spaced from the rung so that in the engaging position the ladder is secured to the roofrack by the hook engaging the rung.

6 Claims, 5 Drawing Sheets

SECURITY ASSEMBLY FOR VEHICLE ROOFRACK

The present invention relates to security devices and more particularly but not exclusively to a security assembly to secure a ladder to the roofracks of a motor vehicle to prevent unauthorised removal of the ladder.

Conventionally in industrial situations, ladders have been conveyed on motor vehicles via "roofracks". However there is a disadvantage in this method of transportation in that the ladders may be removed without the authority of the owner.

It is the object of the present invention to overcome or substantially ameliorate the above disadvantages.

There is disclosed herein a security assembly to secure an object to a motor vehicle roofrack, said assembly comprising a mounting to be fixed to the roofrack, a base pivotally attached to said mounting so that in use the base is pivotable about a horizontal axis, and object engaging member movably mounted on said base so as to be movable along an axis extending generally transverse of the pivot axis of said base, said object engaging member being movable along the transverse axis between an object release position and an objection retaining position, and securing means to selectively retain said object engaging member in said retaining position.

A preferred form of the present invention will now be described by way of example with reference to the accompanying drawings wherein.

Figure 1:
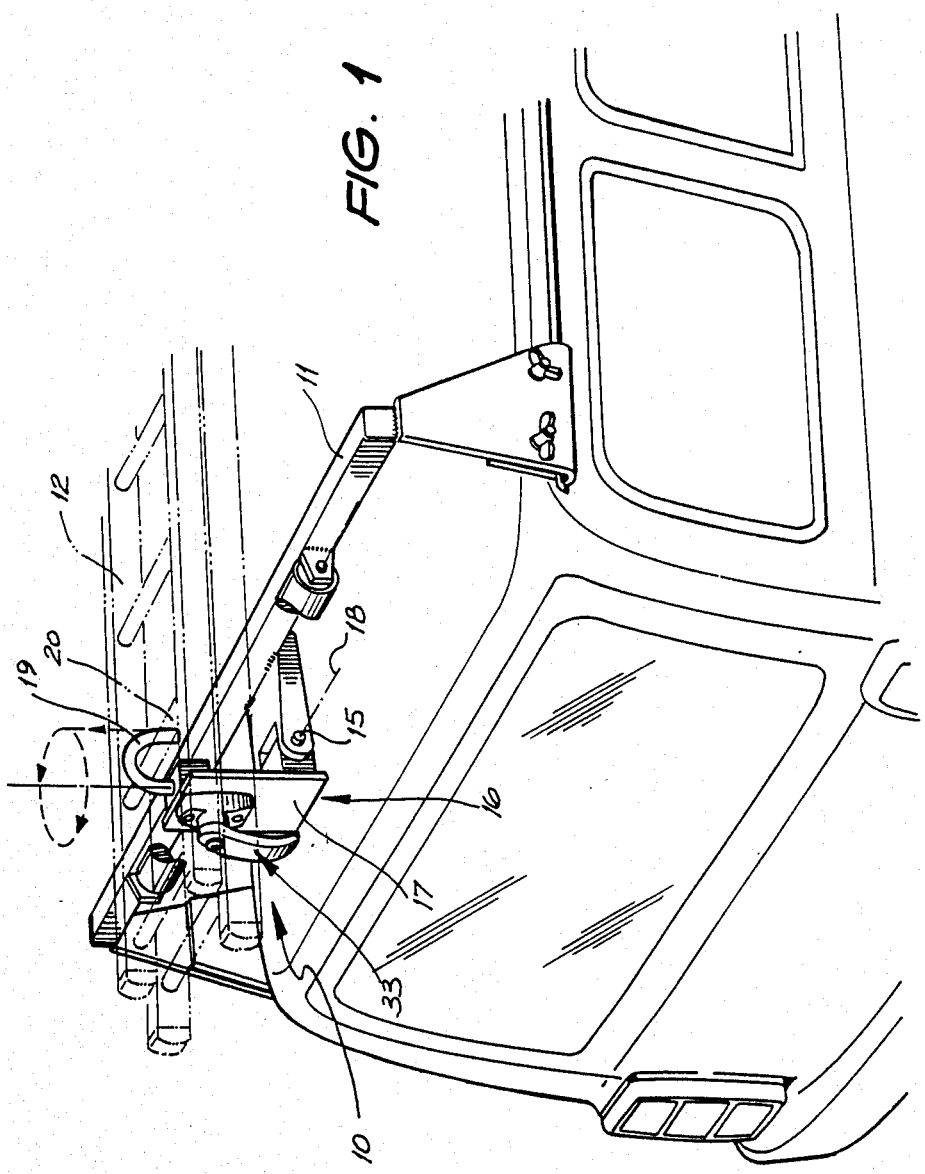
FIG. 1 is a schematic perspective view of a portion of a motor vehicle upon which there is mounted a roofrack and security assembly to secure a ladder to the roofrack.
Figure 2:
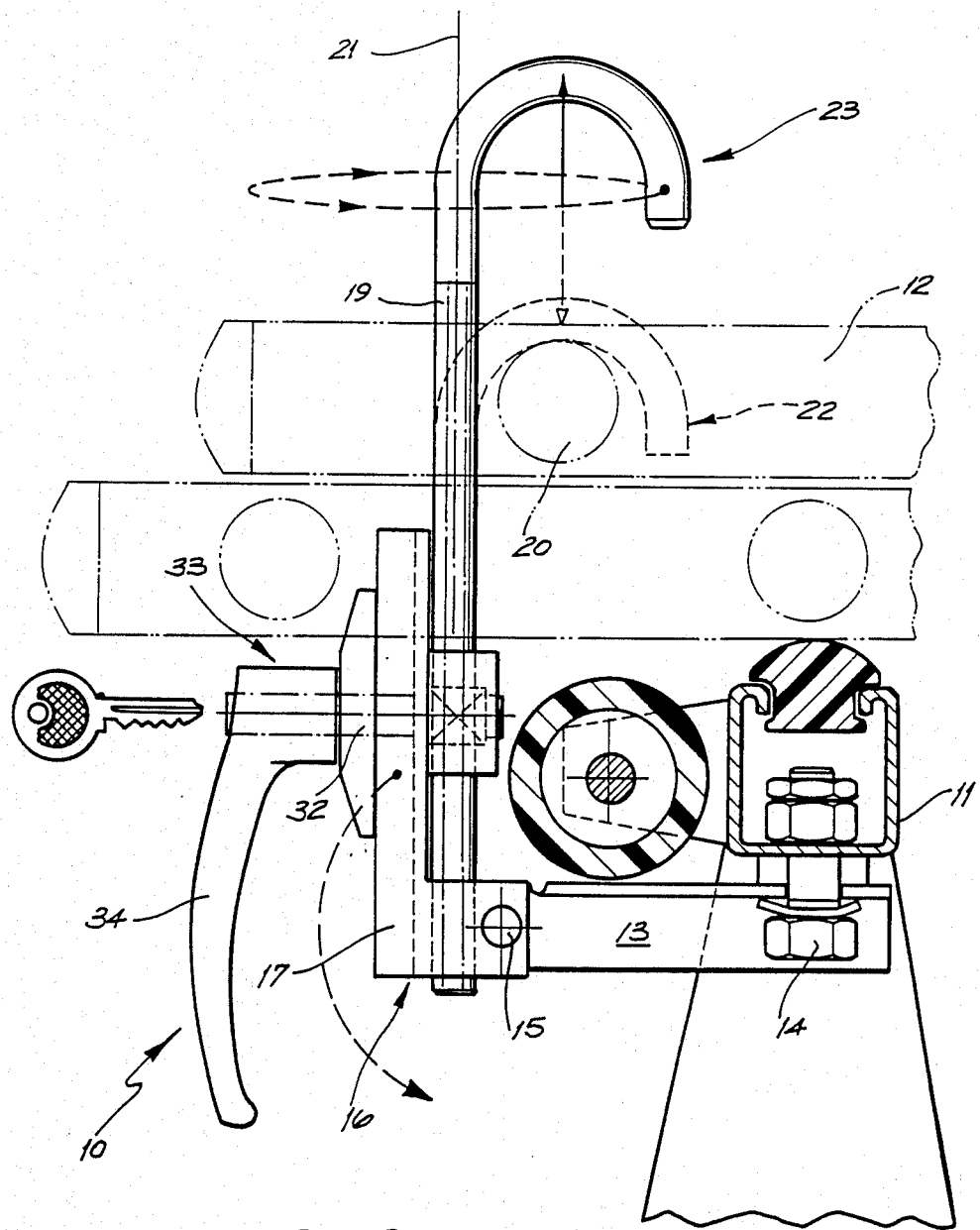
FIG. 2 is a schematic side elevation of the security assembly of FIG. 1.
Figure 3:
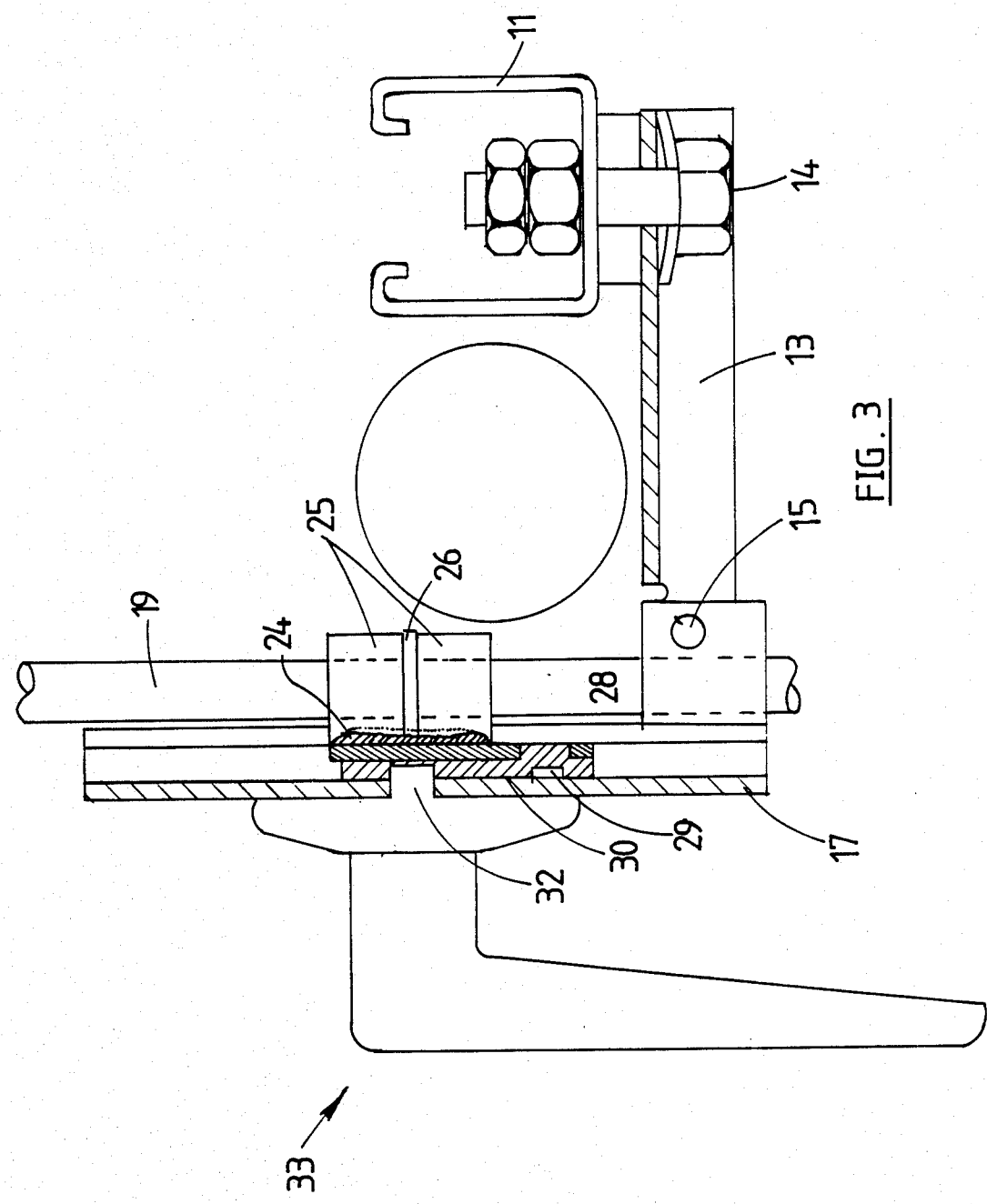
FIG. 3 is a schematic part sectioned side elevation of the security assembly of FIG. 2.
Figure 4:
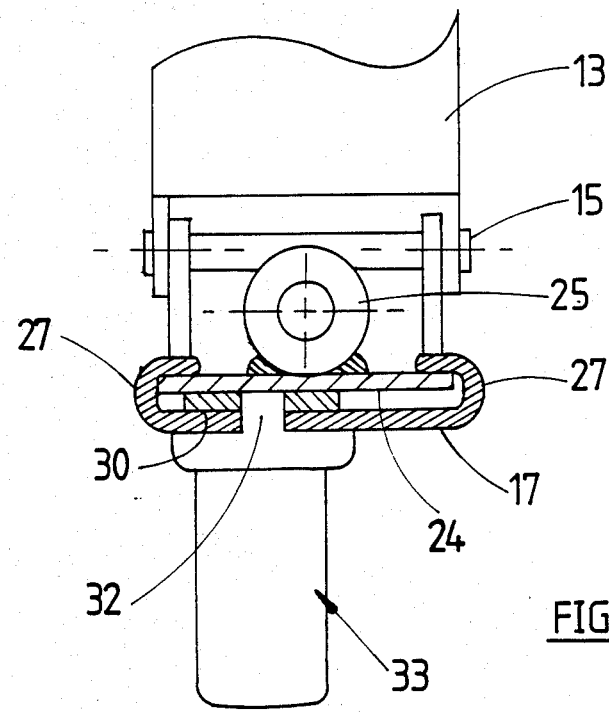
FIG. 4 is a schematic plan view of the security assembly of FIG. 2.
Figure 6:
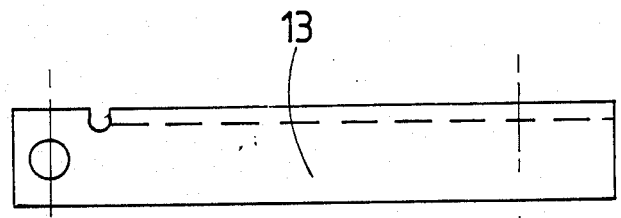
FIG. 6 is a schematic side elevation of the bracket of FIG. 5.
Figure 5:
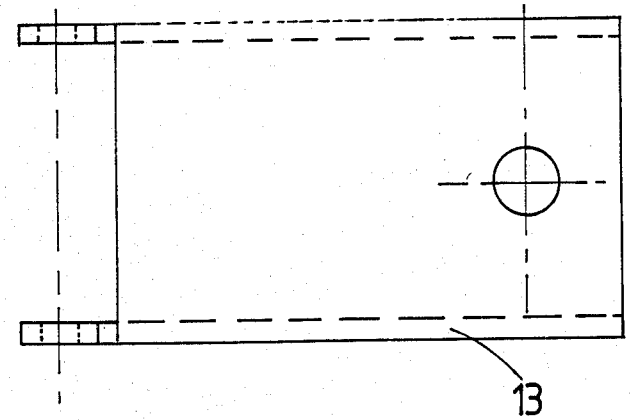
FIG. 5 is a schematic plan view of a mounting bracket employed in the security assembly of FIG. 2.
Figure 8:
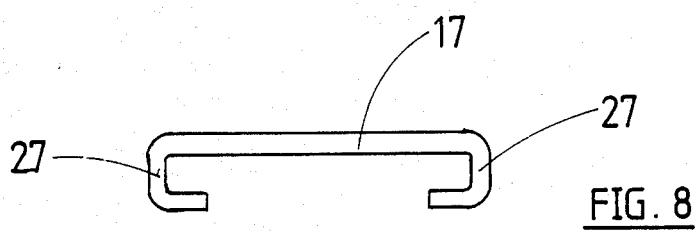
FIG. 8 is a schematic end elevation of a base plate employed in the security assembly of FIG. 2.

In the accompanying drawings there is schematically depicted a security assembly 10 to be attached to a roofrack 11 to secure a ladder 12 to the roofrack 11.

The security assembly 10 includes a mounting bracket 13 secured to the roofrack 11 by one or more bolts 14. The bracket 13 extends generally horizontally from beneath the rack 11 and is provided with a pivot 15 which pivotally supports a base 16 of the security assembly 10. The base 16 includes a plate 17 pivotally attached to the bracket 13 by means of the pivot 15. It should be appreciated that the pivot 15 defines a generally horizontally extending pivot axis 18. Attached to the plate 17 is a ladder engaging rod 19 having a hooked end to engage a ladder rung 20. The rod 19 is movable longitudinally along the axis 21 from an engaging position 22 attaching the ladder 12 to the roofrack 11 by engagement between the hook and the rung 20, and a non-engaging position 23 allowing relative movement between the ladder 12 and the roofrack 11. The rod 19 is attached to a carrier plate 24 via threaded eyelets 25 welded to the plate 24. The rod 19 is threaded and threadably engages the eyelets 25 for adjustment purposes. Located between the eyelets 25 is a nylon washer 26. The eyelets 25 are welded to the plate 24.

Figure 7:
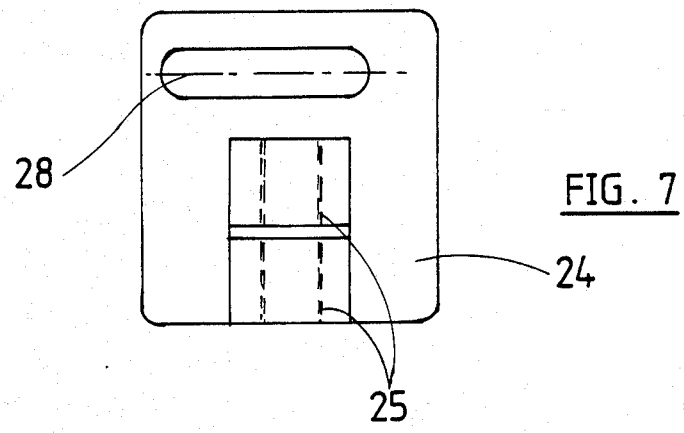
FIG. 7 is a schematic plan view of a base employed in the security assembly of FIG. 2.
Figures 9, 10:
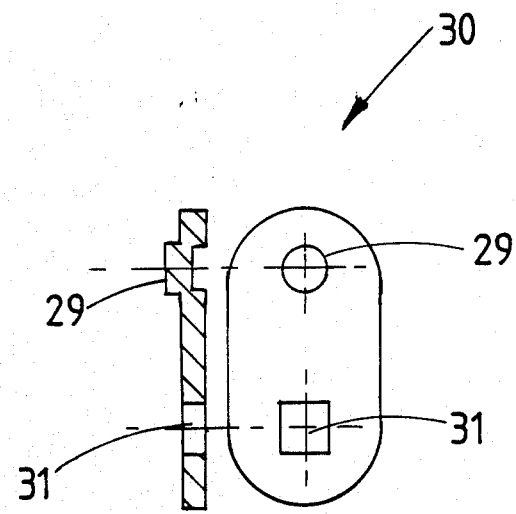
FIG. 9 is a schematic plan view of a cam member employed in the security assembly of FIG. 2.
FIG. 10 is a schematic side elevation of the cam member of Figure 10.

Now with particular reference to FIGS. 4 to 10, wherein the base plate 17, carrier plate 24 and rod 19 are more fully depicted. As best seen from FIG. 4, the base plate 17 has curved edge portions 27 which define channels which slidably receive the carrier plate 24. The base plate is best seen in end elevation in FIG. 8. The carrier plate, as best seen in FIG. 7, includes a slot 28 which extends generally transverse of the axis 21. The slot 28 is engaged by a projection 29 formed in the cam member 30 (as best seen in FIGS. 9 and 10). The cam member 30 has a square aperture 31 which engages the square shaft 32 of the lock 33. The lock 33 is of a generally conventional structure in that it is provided with a key operated barrel which secures the handle 34 in a locked position with the rod 19 in the engaged position 22. By rotation of the handle 34, the shaft 32 cuases rotation of the cam member 30 about the axis 34. Via sliding engagement of the projection 29 in the slot 28, rotation of the cam member 30 causes the carrier plate 24 to move relative to the plate 17 along the axis 21. This movement of the carrier plate 24 causes movement of the rod 17 between the two positions 22 and 23.

In operation of the above described security assembly 10, the lock 33 is actuated in order to move the rod 19 between its two positions 22 and 23. The lock barrel and its associated key are employed to secure the rod 17 in the ladder engaging position 22. Upon movement of the rod 19 to the non-engaging position 23, the security assembly 10 is pivotable about the axis 18 allowing removal of the ladder 12 from the rack 11, or alternatively placement of the ladder 12 on the rack 11 to be secured thereto.

What I claim is:

1. A security assembly to secure an object to a motor vehicle roofrack, said assembly comprising a mounting to be fixed to the roofrack, a base pivotally attached to said mounting so that in use the base is pivotable about a horizontal axis between a security operative first position and an inoperative second position, and object engaging member movably mounted on said base so as to be movable along an axis extending generally transverse of the pivot axis of said base, said object engaging member being movable longitudinally along the transverse axis between an object release position and an object retaining position, and a lockable securing means mounted on the base to selectively retain said object engaging member in said retaining position so that upon location of said base in its first position and then location of said engaging member is said retaining position, said lockable securing means is operated to secure said object to said roofrack.

2. The security assembly of claim 1 wherein said securing means is a lock assembly which is manually operable and which moves said object engaging member between said release position and said retaining position.

3. The security assembly of claim 2 wherein said lock assembly includes a handle pivotally mounted on said base and adapted to be used by an operator, said handle being pivotable about an axis transverse of the axis along which said object engaging member is moved, a projection fixed to said handle but spaced from the pivoting axis thereof, a carrier movably mounted on said base so as to be movable generally parallel to the axis of said movable member, a slot formed in said carrier and within which said projection is located so that upon movement of said handle about its pivot axis, said carrier is caused to move, and wherein said object engaging member is fixed to said carrier to as to be moved thereby upon pivoting of said handle.

4. The security assembly of claim 3 wherein said object engaging member is a rod terminating at one end with a hook.

5. The security assembly of claim 4 wherein said object engaging member is rotatably supported by said carrier so as to be rotatable about the axis along which the object engaging member moves.

6. The security assembly of claim 5 wherein the axis of said object engaging member is generally perpendicular to the pivoting axis of said base.

* * * * *